(12) United States Patent
Morganstern et al.

(10) Patent No.: US 10,244,602 B2
(45) Date of Patent: Mar. 26, 2019

(54) SYSTEMS AND METHODS FOR A VOLTAGE SNUBBER CIRCUIT UTILIZED WITH LIGHT FIXTURES

(71) Applicant: Fluence Bioengineering, Austin, TX (US)

(72) Inventors: Paul Morganstern, Austin, TX (US); Randall Johnson, Austin, TX (US)

(73) Assignee: Fluence Bioengineering, Inc., Austin, TX (US)

( * ) Notice: Subject to any disclaimer, the term of this patent is extended or adjusted under 35 U.S.C. 154(b) by 0 days.

(21) Appl. No.: 15/691,805

(22) Filed: Aug. 31, 2017

(65) Prior Publication Data
US 2019/0045592 A1    Feb. 7, 2019

Related U.S. Application Data

(60) Provisional application No. 62/540,737, filed on Aug. 3, 2017.

(51) Int. Cl.
*H05B 33/08* (2006.01)
*H02H 9/00* (2006.01)

(52) U.S. Cl.
CPC ........... *H05B 33/089* (2013.01); *H02H 9/005* (2013.01); *H05B 33/0824* (2013.01)

(58) Field of Classification Search
None
See application file for complete search history.

(56) References Cited

U.S. PATENT DOCUMENTS

2016/0381773 A1\* 12/2016 Gyoten ............. H05B 33/0824
                                                          315/122

\* cited by examiner

*Primary Examiner* — Douglas W Owens
*Assistant Examiner* — Jianzi Chen
(74) *Attorney, Agent, or Firm* — Pierson IP, PLLC

(57) ABSTRACT

Examples of the present disclosure are related to systems and methods for a voltage snubber circuit utilizing with light fixtures. More particularly, embodiments disclose a voltage snubber that is configured to prevent higher voltages being applied to a light emitting diode (LED) string.

16 Claims, 2 Drawing Sheets

SYSTEMS AND METHODS FOR A VOLTAGE SNUBBER CIRCUIT UTILIZED WITH LIGHT FIXTURES

CROSS-REFERENCE TO RELATED APPLICATIONS

This application claims a benefit of priority under 35 U.S.C. § 119 to Provisional Application No. 62/540,737 filed on Aug. 3, 2017, which is fully incorporated herein by reference in their entirety.

BACKGROUND INFORMATION

Field of the Disclosure

Examples of the present disclosure are related to systems and methods for a voltage snubber circuit for light fixtures. More particularly, embodiments disclose a voltage snubber that is configured to prevent higher voltages being applied to a light emitting diode (LED) string.

Background

Conventional LEDs are sensitive to overvoltage conditions, wherein the voltage in a circuit is raised above its upper design limit. Overvoltage conditions may be hazardous, and lead to a voltage spike or a permanent voltage surge. Considerable damage can be caused to electrical devices by the voltage surge creating higher voltages than that for which the devices are rated for. For example, when overvoltage occurs, an LED may stop working, burst into flames, damage an environment around the LED, etc.

Conventionally to suppress overvoltage conditions circuits have utilized voltage snubbers. Voltage snubbers are used in electrical systems with an inductive load where initialization of current or the sudden interruption of current leads to a sharp rise in voltage across a device. However, constant current power supplies initialize at a higher voltage and ramp down until a desirable current flow is achieved. This initial higher voltage can destroy or damage conventional LEDs that are very sensitive to overvoltage conditions. However, conventional voltage snubbing circuits react slowly to limit the overvoltage conditions in circuits. This slow reaction time leads the LEDs to be in overvoltage conditions for an undesirable period of time.

Accordingly, needs exist for more effective and efficient systems and methods for light fixtures with LEDs that are configured to limit the voltage spike caused by higher initial voltages from a constant current power supply, such that the circuit bypasses around the LEDs while the power supply decreases the voltage.

SUMMARY

Examples of the present disclosure are related to systems and methods for a voltage snubber circuit for light fixtures. More particularly, embodiments disclose a voltage snubber that is configured to prevent higher voltages being applied to a light emitting diode (LED) string. In embodiments, responsive to a constant current power source being initialized, portions of the voltage snubber circuit absorb voltage that bypasses the LED string, which protects the LEDs against a higher voltage startup. Thus, the voltage snubber circuit may be configured to prevent voltages higher than a first voltage threshold being applied to the LEDs.

The voltage snubber circuit may include a power source, voltage regulator circuit, RC time delay circuit, AC regulator, pull down resistor, transistor, LED string, first diode, and second diode.

The power source may be a constant current power supply that is configured to vary the voltage across a load to maintain a constant electric current. The constant current power supply may be utilized as a power source to limit overvoltage conditions by dynamically changing the voltage supplied based on the load.

The voltage regulator circuit may be formed of a resistor and a diode in series that are configured to maintain a constant voltage level from the supplied voltage. For example, in embodiments, the voltage regulator circuit may be configured to form a regulator which outputs 1 to 30 volts.

The RC time delay circuit may be positioned between the voltage regulator circuit and the RC regulator, and may be configured to form a RC time delay to turn on the transistor. The time delay created by the RC time delay circuit may be a set period of time based on a percentage of the charge on a capacitor within the RC time delay and the resistor rating. For example, the RC time delay circuit may be configured to create a 6.5 millisecond delay at 75% charge of the capacitor.

The AC regulator may be configured to prevent any AC component from affecting, reaching, etc. the gate of the transistor. The AC regulator circuit may be positioned between the RC time delay circuit and the pull down resistor.

The pull down resistor may be configured to pull down a gate of the transistor to prevent a random turn on, undesirable turn on, etc. of the transistor. In embodiments, the pull down resistor may be coupled to the AC regulator circuit and the gate of the transistor.

The transistor may be a field-effect transistor that is voltage driven, which may be turned on by five one or more volts. The transistor may include an insulated gate that determines the conductivity of the device. In embodiments, the transistor may be a MOSFET transistor.

The LED string may include at least one LED configured to emit light. The LEDs within the LED string may be positioned in a plurality of different configurations that include LEDs positioned in serial, parallel, and/or a combination.

The first and second diodes may be transient voltage suppression diodes that are configured to divert or shunt voltage spikes from a circuit in order to protect the LED string from over voltage conditions. The first and second diodes may be positioned in parallel to each other, and have different breakdown voltages, wherein both of the breakdown voltages are higher than the turn on voltages of the LED strings. In embodiments, the first and second diodes may have different I-V curves that overlap. This may allow the LED string to be exposed to the power source once the voltage applied to the LED string is below a voltage threshold.

In embodiments, when voltage is applied to the voltage regulator circuit from the power source, the voltage regulator circuit may generate a first voltage level that is directly passed to a RC time delay circuit. The capacitor within the RC time delay circuit may begin charging at a rate determined by a resistor, which may cause a delay for a time when the transistor begins to conduct. While the RC time delay circuit delays the conduction of the transistor, the first and second diode may be conducting, which causes the voltage to bypass the LED strings.

The transistor may begin to conduct as the capacitor's voltage rises above a capacitor voltage level. As the transistor starts to conduct, the power supply may determine the load of the voltage snubber circuit. Responsive to determining the load, the power supply may begin ramping down the voltage, such that the power supply maintains a constant current. In embodiments, the transistor may begin fully conducting at approximately 5 milliseconds after power is supplied from the power supply.

Responsive to the transistor conducting and the voltage supplied by the power source dropping below a first voltage threshold, the first and second diodes may stop conducting. This may expose the LED string to the voltage below the first voltage threshold supplied by the power supply. Subsequently, the power supply may adjust the supplied voltage based on the voltage drop of the LED string. To this end, the voltage snubber circuit may prevent voltages above the first voltage threshold being applied to the LED string.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
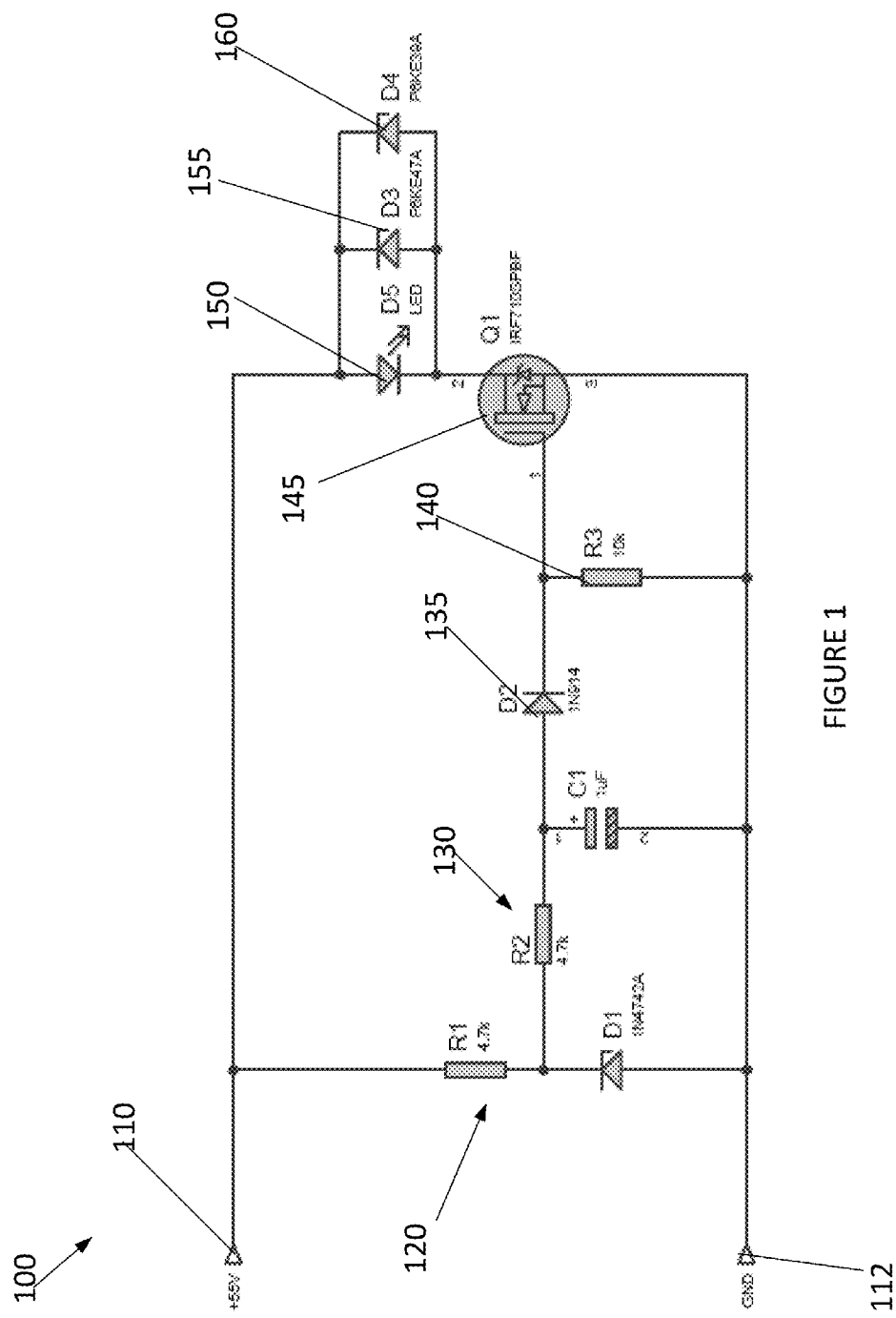
FIG. 1 depicts a voltage snubber circuit, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

FIG. 1 depicts a voltage snubber circuit 100, according to an embodiment. In implementations, voltage snubber circuit 100 may restrict voltages above a first voltage threshold being applied to LED string 150. Voltage snubber circuit 100 may include a power source 110, ground 112, voltage regulator circuit 120, RC time delay circuit 130, AC regulator 135, pull down resistor 140, transistor 145, LED string 150, first diode 155, and second diode 160.

Power source 110 may be a constant current power supply that is configured to vary the voltage across a load to maintain a constant electric current. Responsive to changing the load caused by first diode 150, second diode 160, LED string 150, and/or applied to the gate of transistor 145, the voltage generated by power source 110 may dynamically and automatically change while the current supplied by power source 110 remains substantially constant. In embodiments, power source 110 may be a constant current power supply to limit overvoltage conditions.

Ground 112 may be a reference point in voltage snubber circuit 110 from which voltages are measured, and may act as return path for the electrical current through voltage snubber circuit.

Voltage regulator circuit 120 may be formed of a resistor and a diode positioned in series, wherein voltage regulator circuit 120 may be configured to maintain a constant first voltage level. In embodiments, the constant first voltage level may be above a conductive voltage level of transistor 145. For example, the constant first voltage may be twelve volts. Other voltages may be used. voltages.

The RC time delay circuit 130 may be configured to delay the conductance of transistor 145. RC time delay circuit 130 may be comprised of a resistor and a capacitor positioned in series, wherein a first end of the resistor is positioned between the resistor and diode associated with the voltage regulator circuit 120 and a second end of the capacitor is coupled with ground 112. The delay caused by RC time delay circuit 130 may be based on the resistance value of the resistor and the capacitance of the capacitor, which forms the RC time constant of the RC time delay circuit 130. For example, in embodiments, RC time delay circuit 130 may cause a time delay of 6.5 milliseconds, which may be 75% charge of the capacitor at a given value of the resistor.

AC regulator circuit 130 may be configured to prevent, limit, etc. any AC component from reaching or affecting the gate of the transistor. AC regulator circuit 135 may be a diode positioned between RC time delay circuit 130 and pull down resistor 140 and the gate of transistor 145.

Pull down resistor 140 may be configured to pull down the gate of transistor 140, such that transistor 140 does not undesirably turn on. More specifically, pull down resistor 140 may be configured to hold the logic signal to the gate of transistor 145 at a low logic level when no other active device is supplying power to the gate of transistor 145. Pull down resistor 140 may have a first end positioned between a second end of AC regulator 135 and a gate of transistor and a second end coupled to ground 112.

Transistor 145 may be a field-effect transistor that is voltage driven, which may be turned on by one or more volts. Transistor 145 may include an insulated gate that determines the conductivity of the device. For example, the transistor may be a MOSFET transistor. Transistor 145 may have a gate coupled to pull down resistor 140 and AC regulator circuit 135, which may be configured to supply the constant first voltage level at a given time delay to the gate. Transistor 145 may additionally have a source that is coupled to LED string 150, first diode 155, and second diode 160. The drain of transistor 145 may be grounded.

LED string 150 may be one or a plurality of LEDs or other devices configured to emit light. LED string 150 may include a plurality of different configurations that include LEDs position in serial, parallel, and/or a combination. A first end of LED string 150 may be coupled to power source 110 and a second end of LED string 150 may be coupled to the source of transistor 145. In embodiments, LED string 150 may include any number of LEDs, which may be the same or different LEDs.

The first diode 155 and the second diode 160 may be transient voltage suppressions diodes positioned in parallel that are configured to divert or shunt voltage spikes from voltage snubber circuit 100 in order to protect the LED string 150. First diode 155 and second diode 160 may have first ends that are positioned on a first side of LED string 150, which may be between LED string 150 and power supply 110. First diode 155 and second diode 160 may have second ends that are positioned on a second side of LED string 150, which may be between LED string 150 and the source of transistor 145. Based on the positioning and characteristics of LED string 150, first diode 155, and second diode 160, voltages supplied by power source 110 that are above a first voltage threshold may bypass LED string 150 and only affect first diode 155 and/or second diode 160. One skilled in the art may appreciate that voltage snubber circuit 100 may have more than two diodes positioned in parallel to LED string 150 that are configured to bypass voltage from LED string 150.

First diode 155 may have a first breakdown voltage and a first IV curve, and second diode 160 may have a second breakdown voltage and a second IV curve, wherein the first breakdown voltage may be higher than the second breakdown voltage. Additionally, the breakdown voltages may be higher than the turn on voltage associated with LED string 150. The first IV curve may be different than the second IV curve; however, the IV curves may overlap. This may allow LED string 150 to be exposed to power source 110 only if the voltage applied to LED string is below the first voltage threshold.

Based on the characteristics of the first diode 155 and second diode 160, voltage applied from power source 110 that is higher than the first breakdown voltage or the second breakdown voltage may bypass the LED string 150. The voltage that bypasses LED string 150 is applied to first diode 155 and/or second diode 160, which may continue to the source of transistor 145. This may cause the power source 110 to lower its voltage if transistor 145 is conducting based on the load.

Responsive to the power source 110 lowering its voltage below the first voltage threshold, which may be associated with knee voltage thresholds of the IV curves of the first diode 155 and second diode 160, the first diode 155 and second diode 160 may stop conducting. When first diode 155 and second diode 160 stop conducing, LED string 150 may be exposed to the power source 110. Power source 110 may then adjust the supplied voltage to the voltage drop of load of the LED string 150. This may be due to a difference in load caused by LED string 150 and first diode 155 and/or second diode 160, wherein LED string 150 may have a different load than first diode 155 and/or second diode 160.

Figure 2:
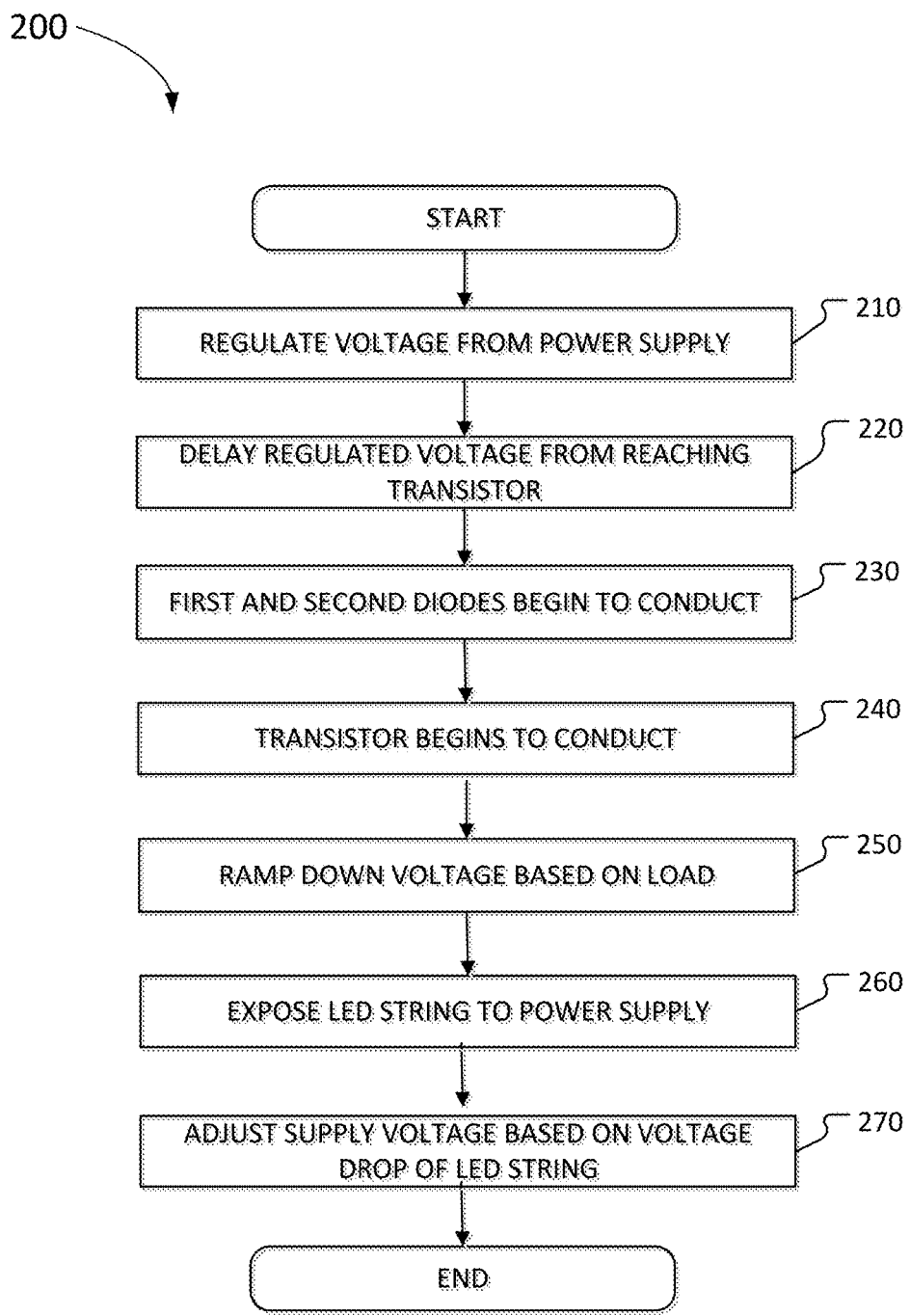
FIG. 2 depicts a method utilizing a voltage snubber circuit, according to an embodiment.

FIG. 2 illustrates a method 200 for a voltage snubber circuit, according to embodiments. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 210, a voltage from a power source may be applied to a voltage regulator, wherein the voltage regulator includes a resistor and diode. The voltage regulator may be configured to generate a first constant voltage from the power supply.

At operation 220, a capacitor within an RC time delay circuit may begin charging at a rate based on a resistor within the RC time delay circuit. While the capacitor is charging, the transistor within the voltage snubber circuit may not be conducting.

At operation 230, due in part to the transistor not conducting, a first diode and a second diode coupled to the source of a transistor may begin to conduct based on the breakdown voltages associated with the diodes. By the first and second diodes conducting, voltage supplied by the power supply may initially bypass a LED string.

At operation 240, responsive to the voltage on the capacitor within the RC time delay circuit being greater than a capacitor threshold that may be based on the capacitance of the capacitor, the transistor may begin to conduct. In embodiments, the RC time delay circuit may be configured to delay the conductance of the transistor based on a time delay corresponding to the resistance of the resistor and the capacitance of the capcitor, such that voltages may be applied to the first and second diode.

At operation 250, as the transistor begins to conduct, the power supply may automatically and dynamically determine the load on the voltage snubber circuit and ramp down the voltage while maintaining a constant current. In embodiments, in a predetermined amount of the time, the transistor may be in full conduction.

At operation 260, as the voltage supplied by the power supply drops below a first voltage threshold, the first and second diodes may stop conduction. This may expose the LED string to the supply voltage.

At operation 270, the power supply may adjust the supplied voltage based on the voltage drop of the LED string. To this end, the voltage snubber circuit may prevent voltages higher than the first voltage threshold from being applied to the LED string.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A voltage snubber circuit for a light source comprising:
    a constant current power supply that is configured to dynamically change a voltage based on a load;
    a first diode coupled with the constant current power supply, the first diode including a first breakdown voltage and a first IV curve;
    a second diode coupled with the constant current power supply, the second diode including a second breakdown voltage and a second IV curve, wherein the first breakdown voltage is higher than the second breakdown voltage and portions of the first IV curve overlap with the portions of the second IV curve;
    a light emitting diode string with a plurality of light emitting diodes coupled with the constant current power supply, the light emitting diode string having a turn on voltage, wherein the first breakdown voltage and the second breakdown voltage are higher than the turn on voltage, the light emitting diode string being positioned in parallel with the first diode and the second diode, wherein the voltage supplied by the constant current power supply bypasses the light emitting diode string if the voltage supplied to the first diode or the second diode is greater than the a first voltage threshold, the turn on voltage being less than the first voltage threshold.

2. The system of claim 1, further comprising:
    a transistor, wherein the first diode, second diode, and the light emitting diode string being coupled to a source of the transistor.

3. The system of claim 2, further comprising:
    a time delay circuit coupled to the constant current power supply and a gate of the transistor, the time delay circuit being configured to delay the conductance of the transistor by a first time delay.

4. The system of claim 3, wherein the transistor does not conduct during the first time delay.

5. The system of claim 3, wherein the first diode conducts during the first time delay.

6. The system of claim 1, wherein the first voltage threshold is associated with a knee voltage threshold of the first diode.

7. A voltage snubber circuit for a light source comprising:
    a constant current power supply that is configured to dynamically change a voltage based on a load;
    a first diode coupled with the constant current power supply, the first diode including a first breakdown voltage and a first IV curve;
    a second diode coupled with the constant current power supply, the second diode including a second breakdown voltage and a second IV curve, wherein the first breakdown voltage is higher than the second breakdown voltage and portions of the first IV curve overlap with the portions of the second IV curve;
    a light emitting diode string with a plurality of light emitting diodes coupled with the constant current power supply, the light emitting diode string having a turn on voltage, wherein the first breakdown voltage and the second breakdown voltage are higher than the turn on voltage, the light emitting diode string being positioned in parallel with the first diode and the second diode, wherein the voltage supplied by the constant current power supply bypasses the light emitting diode string when the voltage supplied to the first diode or the second diode is greater than a first voltage threshold, wherein the voltage supplied by the constant current power supply is applied to the light emitting diode string when the first diode and the second diode stop conducting.

8. The system of claim 7, wherein the constant current power supply is configured to dynamically change the voltage supplied by the constant current power supply based on the load caused by the light emitting diode string.

9. A method for a voltage snubber circuit for a light source comprising:
    supplying a voltage from a constant current power supply that is configured to dynamically change a voltage based on a load;
    coupling a first diode with the constant current power supply, the first diode including a first breakdown voltage and a first IV curve;
    coupling a second diode with the constant current power supply, the second diode including a second breakdown voltage and a second IV curve, wherein the first breakdown voltage is higher than the second breakdown voltage and portions of the first IV curve overlap with the portions of the second IV curve;
    coupling a light emitting diode string with a plurality of light emitting diodes with the constant current power supply, the light emitting diode string having a turn on voltage, wherein the first breakdown voltage and the second breakdown voltage are higher than the turn on voltage, the light emitting diode string being positioned in parallel with the first diode and the second diode;
    bypassing the voltage supplied by the constant current power supply around the light emitting diode string if the voltage supplied to the first diode or the second diode is greater than a first voltage threshold, wherein the turn on voltage is less than the first voltage threshold.

10. The method of claim 9, wherein the first diode, second diode, and the light emitting diode string are coupled in parallel to a source of a transistor.

11. The method of claim 10, further comprising:
  delaying, by a first time delay, a conductance of the transistor by a time delay circuit coupled to the constant current power supply and a gate of the transistor.

12. The method of claim 11, wherein the transistor does not conduct during the first time delay.

13. The method of claim 11, wherein the first diode conducts during the first time delay.

14. The method of claim 9, wherein the first voltage threshold is associated with a knee voltage threshold of the first diode.

15. The method of claim 9, further comprising:
  applying the voltage supplied by the constant current power supply to the light emitting diode string when the first diode and the second diode are stop conducting.

16. The method of claim 15, further comprising:
  dynamically changing the voltage from the constant current power supply based on the load caused by the light emitting diode string.

* * * * *